US009374261B2

(12) United States Patent
Sun et al.

(10) Patent No.: US 9,374,261 B2
(45) Date of Patent: Jun. 21, 2016

(54) SIGNAL MODULATOR AND SIGNAL MODULATING METHOD

(71) Applicant: MEDIATEK INC., Hsin-Chu (TW)

(72) Inventors: Chih-Hao Sun, New Taipei (TW); Chi-Yao Yu, Hsinchu County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/619,082

(22) Filed: Feb. 11, 2015

(65) Prior Publication Data

US 2015/0156053 A1  Jun. 4, 2015

Related U.S. Application Data

(63) Continuation of application No. 13/182,444, filed on Jul. 14, 2011, now abandoned.

(51) Int. Cl.
 *H04L 27/12* (2006.01)
 *H04L 27/36* (2006.01)
 *H04L 27/20* (2006.01)

(52) U.S. Cl.
 CPC .......... *H04L 27/361* (2013.01); *H04L 27/2075* (2013.01)

(58) Field of Classification Search
 CPC .................... H04L 27/361; H04L 27/2075
 USPC .......... 332/103, 144, 102; 375/261, 279, 280, 375/281, 298, 332
 See application file for complete search history.

(56) References Cited

U.S. PATENT DOCUMENTS

| 4,584,715 A | 4/1986 | Baars |
| 5,126,698 A | 6/1992 | Fischer |
| 5,140,198 A | 8/1992 | Atherly |
| 6,029,059 A | 2/2000 | Bojer |

(Continued)

FOREIGN PATENT DOCUMENTS

| TW | 200518454 | 6/2005 |
| WO | 9623366 A1 | 8/1996 |

OTHER PUBLICATIONS

Jan Crols, IEEE Journal of Solid-State Circuits, A Single-Chip 900 MHz CMOS Receiver Front-End with a High Performance Low-IF Topology, Dec. 1995, 1483-1492, vol. 30, No. 12.

(Continued)

*Primary Examiner* — Richard Tan
(74) *Attorney, Agent, or Firm* — Winston Hsu; Scott Margo

(57) ABSTRACT

A signal modulator includes: a modulating circuit; a first signal trace block arranged to conduct a first in-phase oscillating signal to the modulating circuit, and conduct a first quadrature-phase oscillating signal to the modulating circuit; and a second signal trace block arranged to conduct a second in-phase oscillating signal to the modulating circuit, and conduct a second quadrature-phase oscillating signal to the modulating circuit, and a phase difference of the first in-phase oscillating signal caused by the first signal trace block substantially equals a phase difference of the second quadrature-phase oscillating signal caused by the second signal trace block, a second quadrature-phase oscillating signal to the modulating circuit, and a phase difference of the second in-phase oscillating signal caused by the second signal trace block substantially equals a phase difference of the first quadrature-phase oscillating signal caused by the first signal trace block.

19 Claims, 5 Drawing Sheets

(56) References Cited

U.S. PATENT DOCUMENTS

| | | |
|---|---|---|
| 6,226,509 B1 | 5/2001 | Mole |
| 7,324,798 B2 | 1/2008 | Seo |
| 7,519,348 B2 | 4/2009 | Shah |
| 7,567,880 B2 | 7/2009 | Iizuka |
| 7,610,032 B2 | 10/2009 | Davis |
| 7,826,814 B2 | 11/2010 | Masuda |
| 7,848,453 B2 | 12/2010 | Pan |
| 8,174,310 B2 | 5/2012 | Sakamoto |
| 2007/0116015 A1 | 5/2007 | Jones |
| 2008/0157900 A1* | 7/2008 | El Rai .................. H03H 7/185 333/139 |
| 2009/0045850 A1 | 2/2009 | Le Grand De Mercey |

OTHER PUBLICATIONS

Rahul Magoon, IEEE Journal of Solid-State Circuits, A Single-Chip Quad-Band (850/900/1800/1900 MHz) Direct Conversion GSM/GPRS RF Transceiver with Integrated VCOs and Fractional-N Synthesizer, Dec. 2002, 1710-1720, vol. 37, No. 12.

* cited by examiner

SIGNAL MODULATOR AND SIGNAL MODULATING METHOD

CROSS REFERENCE TO RELATED APPLICATIONS

This continuation application claims the benefit of U.S. application Ser. No. 13/182,444, filed on Jul. 14, 2011 and incorporated herein by reference.

BACKGROUND

The present invention relates to a signal modulator and related modulating method, and more particularly to an image-free signal modulator and related modulating method.

In a wireless communication system, such as a low IF (intermediate frequency) transceiving system or an OPLL (Offset Phase-locked loop) transceiving system, two oscillating signals (i.e., the in-phase oscillating signal and the quadrature-phase oscillating signal) having a 90 degree phase difference can be used to modulate/down-convert a radio frequency (RF) receiving signal via a frequency modulator in the receiver to obtain an in-phase input signal and a quadrature-phase input signal, and used to modulate/up-convert a base-band signal via a frequency modulator in the transmitter to obtain an up-converted in-phase signal and a up-converted quadrature-phase signal. When the phase difference between the two oscillating signals is not perfectly 90 degrees, however, some unwanted signal, e.g., the image signal, may be induced in the output of the modulator. Conventionally, the phase mismatch between the in-phase oscillating signal and the quadrature-phase oscillating signal is mainly caused by the length mismatch between the traces utilized for conducting the in-phase oscillating signal and the quadrature-phase oscillating signal respectively. Ideally, the problem of the image signal may be improved by carefully routing the layout of the traces to make them perfectly equal in length and parasitic condition. In practice, however, the intrinsic layout mismatch problem may still cause mismatch of the traces and inevitably generate the image signal. Since the image signal may seriously affect quality of the wireless communication system, such as the linearity, how to remove the image signal that emerges in the output of the frequency modulator in a wireless communication system has become an important issue in this field.

SUMMARY

One of the objectives is to provide an image-free frequency modulator and related modulating method.

According to a first embodiment of the present invention, a signal modulator is provided. The signal modulator comprises a modulating circuit, a first signal trace block, and a second signal trace block. The modulating circuit is arranged to modulate an input signal according to a first oscillating signal, a second oscillating signal, a third oscillating signal, and a fourth oscillating signal. The first signal trace block is arranged to conduct a first in-phase oscillating signal having a first phase to the modulating circuit such that the modulating circuit receives the first oscillating signal having a second phase, and conduct a first quadrature-phase oscillating signal having a third phase to the modulating circuit such that the modulating circuit receives the second oscillating signal having a fourth phase. The second signal trace block is arranged to conduct a second in-phase oscillating signal having a fifth phase to the modulating circuit such that the modulating circuit receives the third oscillating signal having a sixth phase, and conduct a second quadrature-phase oscillating signal having a seventh phase to the modulating circuit such that the modulating circuit receives the fourth oscillating signal having an eighth phase. Wherein a phase difference between the second phase and the first phase and a phase difference between the eighth phase and the seventh phase substantially equal a first phase difference, and a phase difference between the fourth phase and the third phase and a phase difference between the sixth phase and the fifth phase substantially equal a second phase difference, the first phase difference is not equal to the second phase difference.

According to a second embodiment of the present invention, a signal modulating method is provided. The signal modulating method comprises: utilizing a modulating circuit to modulate an input signal according to a first oscillating signal, a second oscillating signal, a third oscillating signal, and a fourth oscillating signal; utilizing a first signal trace block to conduct a first in-phase oscillating signal having a first phase to the modulating circuit such that the modulating circuit receives the first oscillating signal having a second phase, and to conduct a first quadrature-phase oscillating signal having a third phase to the modulating circuit such that the modulating circuit receives the second oscillating signal having a fourth phase; and utilizing a second signal trace block to conduct a second in-phase oscillating signal having a fifth phase to the modulating circuit such that the modulating circuit receives the third oscillating signal having a sixth phase, and to conduct a second quadrature-phase oscillating signal having a seventh phase to the modulating circuit such that the modulating circuit receives the fourth oscillating signal having an eighth phase. Wherein a phase difference between the second phase and the first phase and a phase difference between the eighth phase and the seventh phase substantially equal a first phase difference, and a phase difference between the fourth phase and the third phase and a phase difference between the sixth phase and the fifth phase substantially equal a second phase difference, the first phase difference is not equal to the second phase difference.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
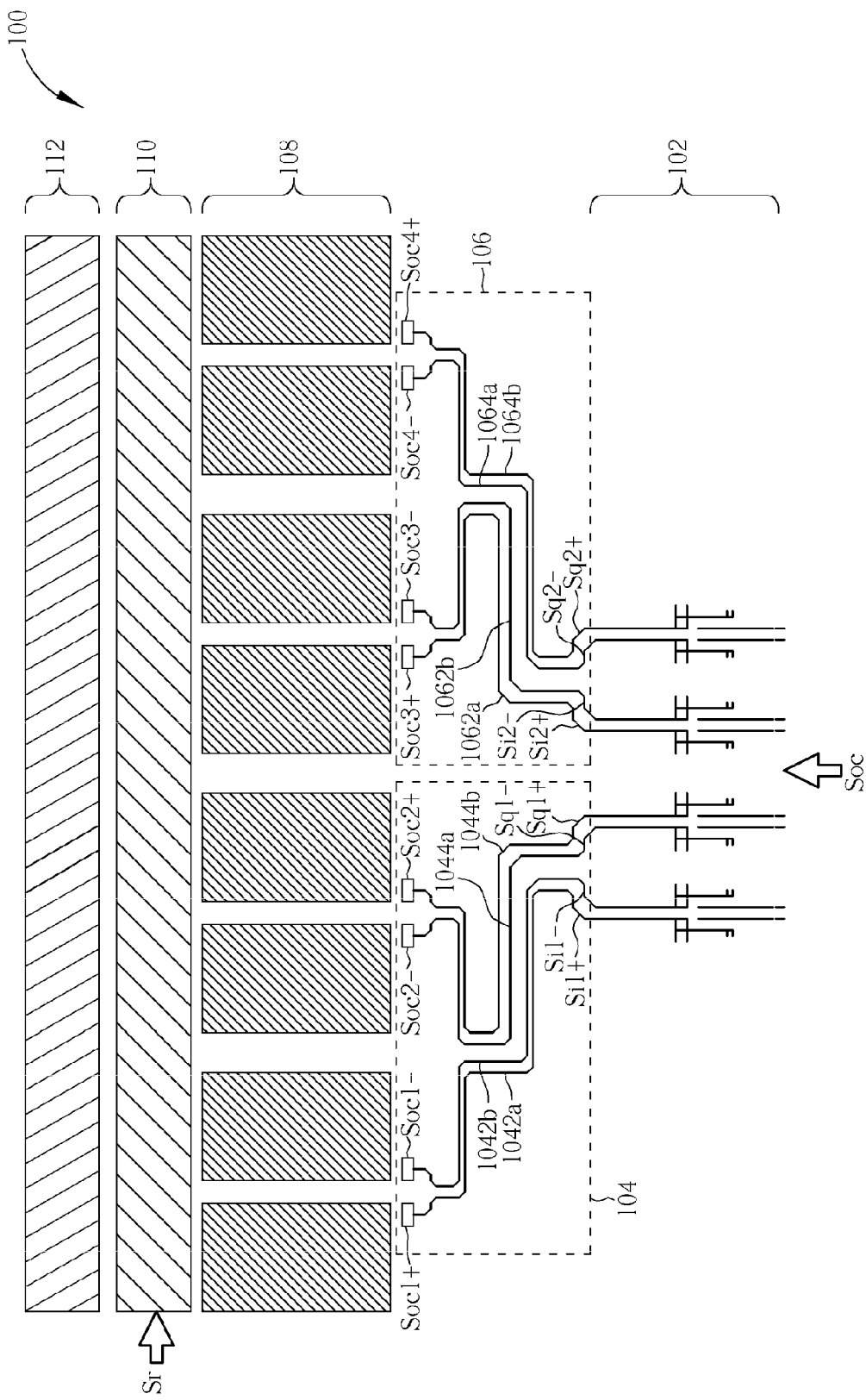
FIG. 1 is a layout illustrating a signal modulator according to a first embodiment of the present invention.
Figure 2:
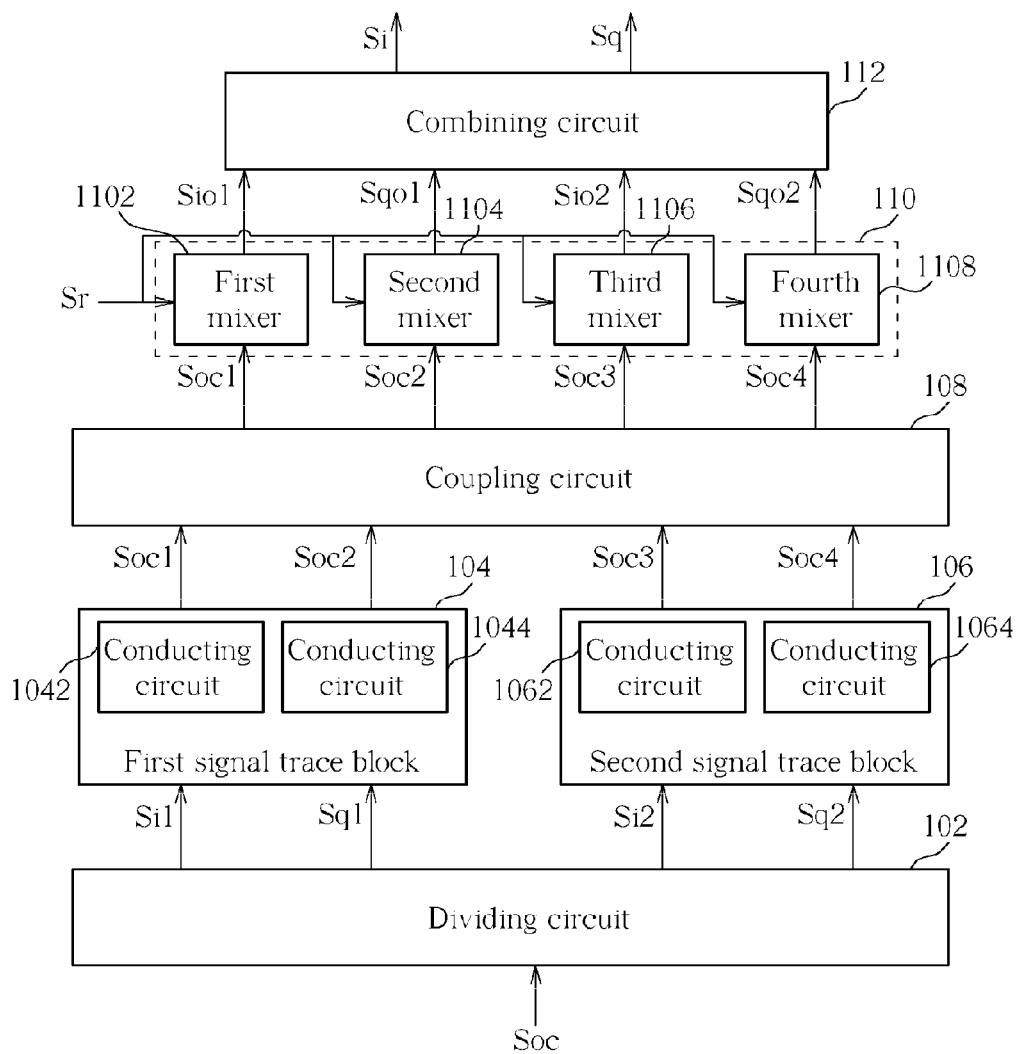
FIG. 2 is an equivalent circuit diagram of the signal modulator as shown in FIG. 1.

Please refer to FIG. 1 in conjunction with FIG. 2. FIG. 1 is a layout illustrating a signal modulator 100 according to a first embodiment of the present invention. FIG. 2 is an equivalent circuit diagram of the signal modulator 100 as shown in FIG. 1. The signal modulator 100 comprises a dividing circuit 102, a first signal trace block 104, a second signal trace block 106, a coupling circuit 108, a modulating circuit 110, and a combining circuit 112. In this embodiment, the signal modulator 100 is a part of a receiver arranged to receive a wireless communication signal Sr being a radio frequency (RF) signal; however, this is not a limitation of the present invention. After appropriately modifying the signal modulator 100, the signal modulator 100 may also be used in a transmitter arranged to transmit a base-band signal into an IF (intermediate frequency) signal or an RF signal (e.g., the wireless communication signal Sr) according to the first oscillating signal Soc1, the second oscillating signal Soc2, the third oscillating signal Soc3, and the fourth oscillating signal Soc4 as shown in FIG. 1.

In this embodiment, the dividing circuit 102 is used to divide an oscillating signal Soc to generate a first in-phase oscillating signal Si1, a second in-phase oscillating signal Si2, a first quadrature-phase oscillating signal Sq1, and a second quadrature-phase oscillating signal Sq2. It is noted that the phase difference between the phase P1 of the first in-phase oscillating signal Si1 and the phase P2 of the first quadrature-phase oscillating signal Sq1 is 90 degrees, and the phase difference between the phase P3 of the second in-phase oscillating signal Si2 and the phase P4 of the second quadrature-phase oscillating signal Sq2 is also 90 degrees.

The modulating circuit 110 is arranged to modulate the wireless communication signal Sr according to a first oscillating signal Soc1, a second oscillating signal Soc2, a third oscillating signal Soc3, and a fourth oscillating signal Soc4. When the first in-phase oscillating signal Si1, the second in-phase oscillating signal Si2, the first quadrature-phase oscillating signal Sq1, and the second quadrature-phase oscillating signal Sq2 are generated, the first signal trace block 104 is arranged to conduct the first in-phase oscillating signal Si1 to the modulating circuit 110 such that the modulating circuit 110 receives the first oscillating signal Soc1 having a phase of Po1, and conduct the first quadrature-phase oscillating signal Sq1 to the modulating circuit 110 such that the modulating circuit 110 receives the second oscillating signal Soc2 having a phase of Po2. The second signal trace block 106 is arranged to conduct the second in-phase oscillating signal Si2 to the modulating circuit 110 such that the modulating circuit 110 receives the third oscillating signal Soc3 having a phase of Po3, and conduct the second quadrature-phase oscillating signal Sq2 to the modulating circuit 110 such that the modulating circuit 110 receives the fourth oscillating signal Soc4 having a phase of Po4. According to the arrangement of the first signal trace block 104 and the second signal trace block 106, the phase difference between the phase Po1 and the phase P1 substantially equals the phase difference between the phase Po4 and the phase P4, and the phase difference between the phase Po2 and the phase P2 substantially equals the phase difference between the phase Po3 and the phase P3.

It should be noted that, in this embodiment, the signal modulator 100 is installed in a part of a differential receiver, therefore the signal modulator 100 is also a differential circuit system, which means that the first in-phase oscillating signal Si1, the first quadrature-phase oscillating signal Sq1, the second in-phase oscillating signal Si2, the second quadrature-phase oscillating signal Sq2, the first oscillating signal Soc1, the second oscillating signal Soc2, the third oscillating signal Soc3, and the fourth oscillating signal Soc4 are differential oscillating signals each comprising a positive (+) oscillating signal and a negative (−) oscillating signal. Therefore, the first signal trace block 104 comprises a conducting circuit 1042 and a conducting circuit 1044, wherein the conducting circuit 1042 further comprises a conducting trace 1042a and a conducting trace 1042b arranged to conduct the positive oscillating signal Si1+ and the negative oscillating signal Si1− of the first in-phase oscillating signal Si1 to the modulating circuit 110 to be Soc1+ and Soc1− respectively; and the second conducting circuit 1044 further comprises a conducting trace 1044a and a conducting trace 1044b arranged to conduct the negative oscillating signal Sq1− and the positive oscillating signal Sq1+ of the first quadrature-phase oscillating signal Sq1 to the modulating circuit 110 to be Soc2− and Soc2+ respectively. The second signal trace block 106 comprises a conducting circuit 1062 and a conducting circuit 1064, wherein the conducting circuit 1062 further comprises a conducting trace 1062a and a conducting trace 1062b arranged to conduct the positive oscillating signal Si2+ and the negative oscillating signal Si2− of the second in-phase oscillating signal Si2 to the modulating circuit 110 to be Soc3+ and Soc3− respectively; and the conducting circuit 1064 further comprises a conducting trace 1064a and a conducting trace 1064b arranged to conduct the negative oscillating signal Sq2− and the positive oscillating signal Sq2+ of the second quadrature-phase oscillating signal Sq2 to the modulating circuit 110 to be Soc4− and Soc4+ respectively. It should be noted that the conducting circuit 1042 and the conducting circuit 1064 are bilaterally symmetric to each other, and the conducting circuit 1044 and the conducting circuit 1062 are bilaterally symmetric to each other. More specifically, the conducting trace 1042a and the conducting trace 1064b are bilaterally symmetric to each other, the conducting trace 1042b and the conducting trace 1064a are bilaterally symmetric to each other, the conducting trace 1044a and the conducting trace 1062b are bilaterally symmetric to each other, and the conducting trace 1044b and the conducting trace 1062a are bilaterally symmetric to each other as shown in FIG. 1.

In other words, in this embodiment, the conducting trace 1042a and the conducting trace 1064b are equal in length, the conducting trace 1042b and the conducting trace 1064a are equal in length, the conducting trace 1044a and the conducting trace 1062b are equal in length, and the conducting trace 1044b and the conducting trace 1062a are equal in length. The order of coupling the first in-phase oscillating signal Si1 and the first quadrature-phase oscillating signal Sq1 to the first signal trace block 104 (i.e., the order from left to middle in FIG. 1) is the same as the order of coupling the second in-phase oscillating signal Si2 and the second quadrature-phase oscillating signal Sq2 to the second signal trace block 106 (i.e., the order from the middle to right in FIG. 1).

The coupling circuit 108 is an AC coupling circuit utilized for coupling the first oscillating signal Soc1, the second oscillating signal Soc2, the third oscillating signal Soc3, and the fourth oscillating signal Soc4 to the modulating circuit 110, in which the modulating circuit 110 is arranged to receive the first oscillating signal Soc1, the second oscillating signal Soc2, the third oscillating signal Soc3, and the fourth oscillating signal Soc4 for down-converting the wireless communication signal Sr from the radio frequency into the IF frequency. Furthermore, the modulating circuit 110 comprises a first mixer 1102, a second mixer 1104, a third mixer 1106, and a fourth mixer 1108. The first mixer 1102 is coupled to the conducting circuit 1042 and arranged to modulate the wireless communication signal Sr to generate a first in-phase output signal Sio1 according to the first oscillating signal Soc1. The second mixer 1104 is coupled to the conducting circuit 1044 and arranged to modulate the wireless communication signal Sr to generate a first quadrature-phase output signal Sqo1 according to the second oscillating signal Soc2. The third mixer 1106 is coupled to the conducting circuit 1062 and arranged to modulate the wireless communication signal Sr to generate a second in-phase output signal Sio2 according to the third oscillating signal Soc3. The fourth mixer 1108 is coupled to the conducting circuit 1064 and arranged to modulate the wireless communication signal Sr to generate a second quadrature-phase output signal Sqo2 according to the fourth oscillating signal Soc4.

Furthermore, the combining circuit 112 is coupled to the first mixer 1102, the second mixer 1104, the third mixer 1106, and the fourth mixer 1108, the combining circuit 112 is arranged to generate an in-phase signal Si by combining the first in-phase output signal Sio1 and the second in-phase output signal Sio2 and generate a quadrature-phase signal Sq by combining the first quadrature-phase output signal Sqo1 and the second quadrature-phase output signal Sqo2.

According to FIG. 1, it can be seen that the conducting circuit 1042 and the conducting circuit 1064 are bilaterally symmetric to each other, and the conducting circuit 1044 and the conducting circuit 1062 are bilaterally symmetric to each other, therefore the phase difference between the first oscillating signal Soc1 and the first in-phase oscillating signal Si1, which is caused by the conducting circuit 1042, is equal to the phase difference between the fourth oscillating signal Soc4 and the second quadrature-phase oscillating signal Sq2, which is caused by the conducting circuit 1064, and the phase difference between the second oscillating signal Soc2 and the first quadrature-phase oscillating signal Sq1, which is caused by the conducting circuit 1044, is equal to the phase difference between the third oscillating signal Soc3 and the second in-phase oscillating signal Si2, which is caused by the conducting circuit 1062. Moreover, the effective phase difference between the first oscillating signal Soc1 and the second oscillating signal Soc2 is larger than a specific phase difference (e.g., 90 degree) by a phase value (e.g., $\Psi rr$ in the following FIG. 3A and FIG. 3B), and the effective phase difference between the third oscillating signal Soc3 and the fourth oscillating signal Soc4 is smaller than the specific phase difference by the phase value. For simplicity, the following mathematical calculation concerning the signal modulator 100 assumes that the first in-phase oscillating signal Si1 is the same as the second in-phase oscillating signal Si2, and the first quadrature-phase oscillating signal Sq1 is the same as the second quadrature-phase oscillating signal Sq2. In other words, the phase P1 of the first in-phase oscillating signal Si1 is the same as the phase P3 of the second in-phase oscillating signal Si2, and the phase P2 of the first quadrature-phase oscillating signal Sq1 is the same as the phase P4 of the second quadrature-phase oscillating signal Sq2.

Figure 3A:
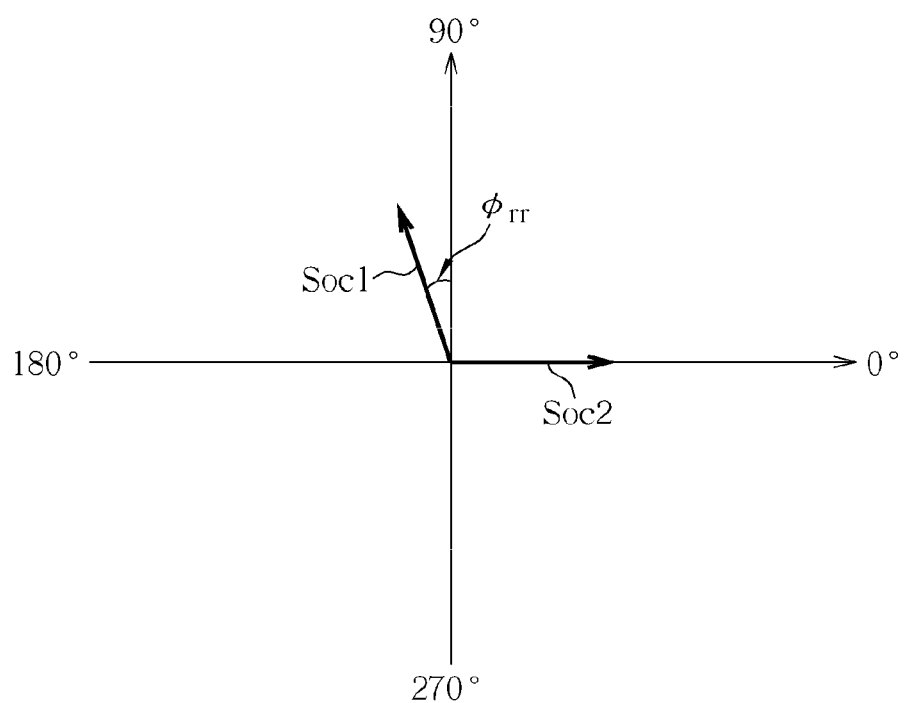
FIG. 3A is a diagram illustrating the relationship between a phase of a first oscillating signal and a phase of a second oscillating signal.
Figure 3B:
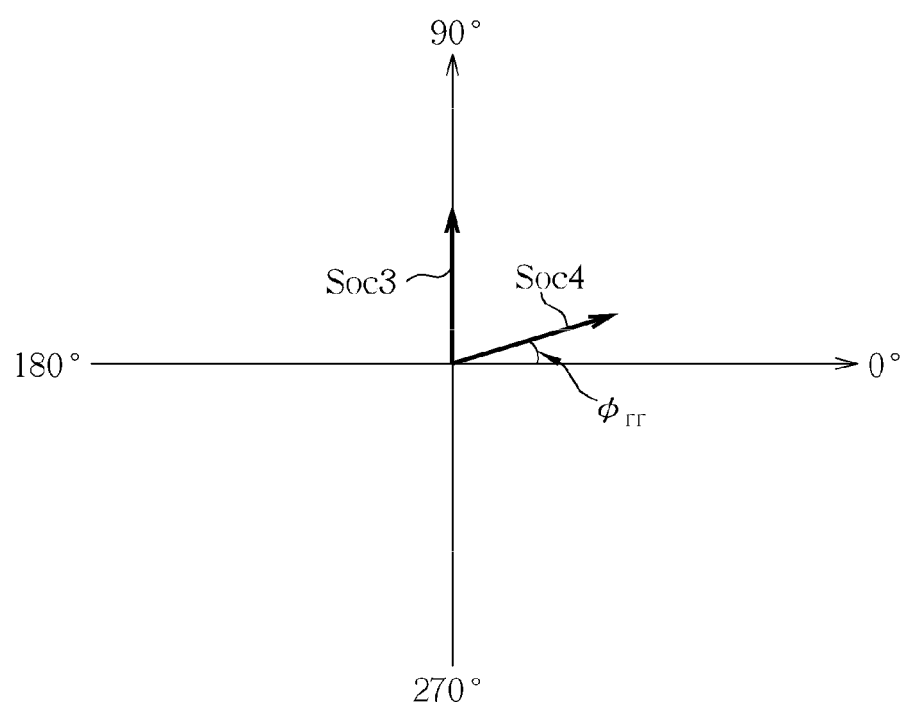
FIG. 3B is a diagram illustrating the relationship between a phase of a third oscillating signal and a phase of a fourth oscillating signal.

If the wireless communication signal Sr is represented by $\cos[(\omega_{LO}+\Delta\omega)t]$, and the image signal of the wireless communication signal Sr is represented by $\cos[(\omega_{LO}t-\Delta\omega)t]$, the first in-phase oscillating signal Si1 and the second in-phase oscillating signal Si2 can be represented by $\cos(\omega_{LO}t)$, the first quadrature-phase oscillating signal Sq1 and the second quadrature-phase oscillating signal Sq2 can be represented by $\sin(\omega_{LO}t)$, the phase error induced by the difference between the conducting circuit 1042 and the conducting circuit 1044 is $\Psi rr$, and the phase error induced by the difference between the conducting circuit 1062 and the conducting circuit 1064 is also $\Psi rr$, then the first oscillating signal Soc1 can also be represented by $\cos(\omega_{LO}t)$, the second oscillating signal Soc2 can be represented by $\sin[(\omega_{LO})t+\Phi rr]$, the third oscillating signal Soc3 can be represented by $\cos[(\omega_{LO})t+\Phi rr]$, and the fourth oscillating signal Soc4 can be represented by $\sin(\omega_{LO}t)$. Please also refer to FIG. 3A and FIG. 3B. FIG. 3A is a diagram illustrating the relationship between the phase Po1 of the first oscillating signal Soc1 and the phase Po2 of the second oscillating signal Soc2. FIG. 3B is a diagram illustrating the relationship between the phase Po3 of the third oscillating signal Soc3 and the phase Po4 of the fourth oscillating signal Soc4. Therefore, the phase mismatch (i.e., $\Psi rr$) between the phase Po1 of the first oscillating signal Soc1 and the phase Po2 of the second oscillating signal Soc2 is equal to the phase mismatch (i.e., $\Psi rr$) between the phase Po3 of the third oscillating signal Soc3 and the phase Po4 of the fourth oscillating signal Soc4.

For the wireless communication signal Sr of $\cos[(\omega_{LO}t+\Delta\omega)t]$: the output signal of the first mixer 1102 combined with the output signal of the second mixer 1104 can be represented by equation (1):

$$Sc1 = \cos(\Delta\omega t) + \frac{1}{2}\phi rr \cdot \sin(\Delta\omega t) \qquad (1)$$

The output signal of the third mixer 1106 combined with the output signal of the fourth mixer 1108 can be represented by equation (2):

$$Sc2 = \cos(\Delta\omega t) + \frac{1}{2}\phi rr \cdot \sin(\Delta\omega t) \qquad (2)$$

For the image signal $\cos[(\omega_{LO}t-\Delta\omega)t]$: the output signal of the first mixer 1102 combined with the output signal of the second mixer 1104 can be represented by equation (3):

$$Sc3 = \frac{1}{2}\cos(\Delta\omega t) - \frac{1}{2}\cos(\Delta\omega t) + \frac{1}{2}\phi rr \cdot \sin(\Delta\omega t) \qquad (3)$$

The output signal of the third mixer 1106 combined with the output signal of the fourth mixer 1104 can be represented by equation (4):

$$Sc4 \cong \frac{1}{2}\cos(\Delta\omega t) - \frac{1}{2}\phi rr \cdot \sin(\Delta\omega t) - \frac{1}{2}\cos(\Delta\omega t) \qquad (4)$$

Therefore, according to the above mathematical calculation concerning the signal modulator 100, when the signal Sc3 is combined with the signal Sc4, the signal Sc3 and the signal Sc4 cancel each other, which means that the image signal $\cos[(\omega_{LO}t-\Delta\omega)t]$ of the wireless communication signal Sr will substantially contribute no signal component in the output of the combining circuit 112. It should be noted that, in this embodiment, the wanted signal is obtained by combining the signal Sc1 and the signal Sc2.

Figure 4:
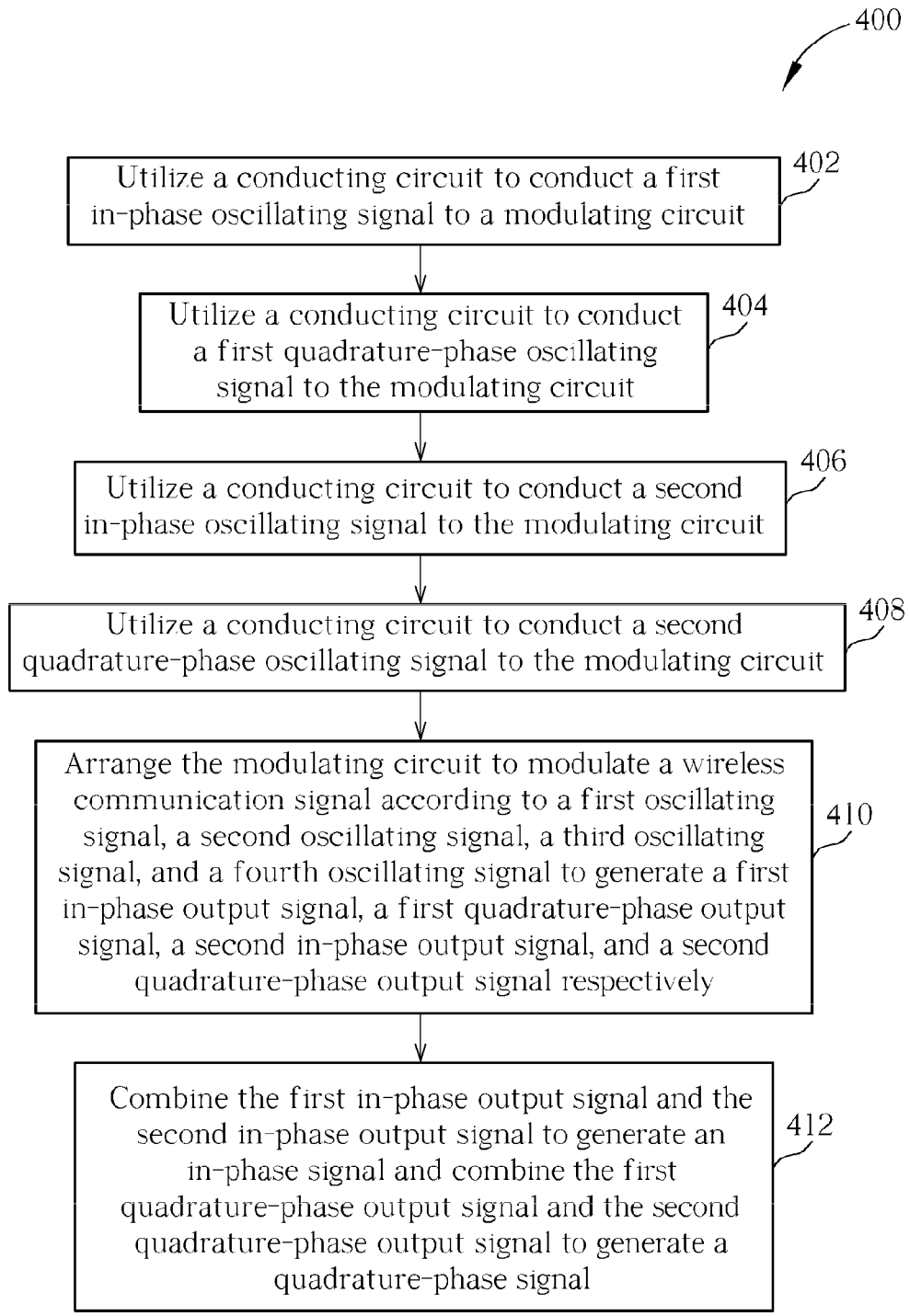
FIG. 4 is a flowchart illustrating a signal modulating method according to a second embodiment of the present invention.

Accordingly, the operation of the above embodiment can be summarized in the steps shown in FIG. 4. FIG. 4 is a flowchart illustrating a signal modulating method 400 according to a second embodiment of the present invention. For brevity, details of the signal modulating method 400 can be obtained by referring to the above paragraphs concerning the signal modulator 100. Provided that substantially the same result is achieved, the steps of the flowchart shown in FIG. 4 need not be in the exact order shown and need not be contiguous, that is, other steps can be intermediate. The signal modulating method 400 comprises the steps:

Step 402: Utilize the conducting circuit 1042 to conduct the first in-phase oscillating signal Si1 to the modulating circuit 110;

Step 404: Utilize the conducting circuit 1044 to conduct the first quadrature-phase oscillating signal Sq1 to the modulating circuit 110;

Step 406: Utilize the conducting circuit 1062 to conduct the second in-phase oscillating signal Si2 to the modulating circuit 110;

Step 408: Utilize the conducting circuit 1064 to conduct the second quadrature-phase oscillating signal Sq2 to the modulating circuit 110;

Step 410: Arrange the modulating circuit 110 to modulate the wireless communication signal Sr according to the first oscillating signal Soc1, the second oscillating signal Soc2, the third oscillating signal Soc3, and the fourth oscillating signal Soc4 to generate the first in-phase output signal Sio1, the first quadrature-phase output signal Sqo1, the second in-phase output signal Sio2, and the second quadrature-phase output signal Sqo2 respectively;

Step 412: Combine the first in-phase output signal Sio1 and the second in-phase output signal Sio2 to generate the in-phase signal Si and combine the first quadrature-phase output signal Sqo1 and the second quadrature-phase output signal Sqo2 to generate the quadrature-phase signal Sq.

According to the embodiment, the objective is to make the phase difference between the first oscillating signal Soc1 and the first in-phase oscillating signal Si1, caused by the conducting circuit 1042, equal to the phase difference between the fourth oscillating signal Soc4 and the second quadrature-phase oscillating signal Sq2, which is caused by the conducting circuit 1064, and the phase difference between the second oscillating signal Soc2 and the first quadrature-phase oscillating signal Sq1, which is caused by the conducting circuit 1044, equal to the phase difference between the third oscillating signal Soc3 and the second in-phase oscillating signal Si2, which is caused by the conducting circuit 1062, therefore the conducting circuit 1042 and the conducting circuit 1064 are designed to be bilaterally symmetric to each other, and the conducting circuit 1044 and the conducting circuit 1062 are also designed to be bilaterally symmetric to each other. Then, according to the above-mentioned mathematical calculation concerning the signal modulator 100, the signal component induced by the image signal $\cos[(\omega_{LO}t-\Delta\omega)t]$ of the wireless communication signal Sr cancel each other at the output of the combining circuit 112.

Briefly, the present exemplary embodiments use four mixers (i.e., 1102-1108) to modulate the wireless communication signal Sr according to four oscillating signals (i.e., Soc1-Soc4) to generate the first in-phase output signal Sio1, the first quadrature-phase output signal Sqo1, the second in-phase output signal Sio2, and the second quadrature-phase output signal Sqo2 respectively, then the in-phase signal Si is obtained by combining the first in-phase output signal Sio1 and the second in-phase output signal Sio2, and the quadrature-phase signal Sq is obtained by combining the first quadrature-phase output signal Sqo1 and the second quadrature-phase output signal Sqo2. By appropriately designing the conducting circuits 1042, 1044, 1062, and 1064 that conduct the first in-phase oscillating signal Si1, the first quadrature-phase oscillating signal Sq1, the second in-phase oscillating signal Si2, the second quadrature-phase oscillating signal Sq2 respectively, the signal component induced by the image signal $\cos[(\omega_{LO}t-\Delta\omega)t]$ of the wireless communication signal Sr can cancel each other after being combined by the combining circuit 112.

Those skilled in the art will readily observe that numerous modifications and alterations of the device and method may be made while retaining the teachings of the invention.

What is claimed is:

1. A signal modulator, comprising:
   a modulating circuit, arranged to modulate an input signal according to a first oscillating signal, a second oscillating signal, a third oscillating signal, and a fourth oscillating signal;
   a first signal trace block, arranged to conduct a first in-phase oscillating signal having a first phase to the modulating circuit such that the modulating circuit receives the first oscillating signal having a second phase, and conduct a first quadrature-phase oscillating signal having a third phase to the modulating circuit such that the modulating circuit receives the second oscillating signal having a fourth phase; and
   a second signal trace block, arranged to conduct a second in-phase oscillating signal having a fifth phase to the modulating circuit such that the modulating circuit receives the third oscillating signal having a sixth phase, and conduct a second quadrature-phase oscillating signal having a seventh phase to the modulating circuit such that the modulating circuit receives the fourth oscillating signal having an eighth phase;
   wherein a phase difference between the second phase and the first phase and a phase difference between the eighth phase and the seventh phase substantially equal a first phase difference, and a phase difference between the fourth phase and the third phase and a phase difference between the sixth phase and the fifth phase substantially equal a second phase difference, the first phase difference is not equal to the second phase difference;
   wherein the first in-phase oscillating signal, the first quadrature-phase oscillating signal, the second in-phrase oscillating signal, and the second quadrature-phase oscillating signal are differential oscillating signals, and each of the differential oscillating signals comprises a positive oscillating signal and a negative oscillating signal.

2. The signal modulator of claim 1, wherein a phase of the first in-phase oscillating signal is the same as a phase of the second in-phase oscillating signal, and a phase of the first quadrature-phase oscillating signal is the same as a phase of the second quadrature-phase oscillating signal.

3. The signal modulator of claim 1, wherein the first signal trace block comprises:
   a first conducting circuit, arranged to conduct the first in-phase oscillating signal to the modulating circuit; and
   a second conducting circuit, arranged to conduct the first quadrature-phase oscillating signal to the modulating circuit; and
   the second signal trace block comprises:
   a third conducting circuit, arranged to conduct the second in-phase oscillating signal to the modulating circuit; and a fourth conducting circuit, arranged to conduct the second quadrature-phase oscillating signal to the modulating circuit;

wherein one of the first conducting circuit and the second conducting circuit and one of the third conducting circuit and the fourth conducting circuit are symmetric to each other.

4. The signal modulator of claim 3, wherein the first conducting circuit and the fourth conducting circuit are bilaterally symmetric to each other, and the second conducting circuit and the third conducting circuit are bilaterally symmetric to each other.

5. The signal modulator of claim 1, wherein the first signal trace block comprises:

a first conducting circuit, comprising a first conducting trace and a second conducting trace arranged to conduct the positive oscillating signal and the negative oscillating signal of the first in-phase oscillating signal to the modulating circuit, respectively;

a second conducting circuit, comprising a third conducting trace and a fourth conducting trace arranged to conduct the negative oscillating signal and the positive oscillating signal of the first quadrature-phase oscillating signal to the modulating circuit, respectively;

the second signal trace block comprises:

a third conducting circuit, comprising a fifth conducting trace and a sixth conducting trace arranged to conduct the positive oscillating signal and the negative oscillating signal of the second in-phase oscillating signal to the modulating circuit, respectively;

a fourth conducting circuit, comprising a seventh conducting trace and an eighth conducting trace arranged to conduct the negative oscillating signal and the positive oscillating signal of the second quadrature-phase oscillating signal to the modulating circuit, respectively;

wherein one of the conducting traces of the first signal trace block and one of the conducting traces of the second signal trace block are symmetric to each other.

6. The signal modulator of claim 5, wherein the first conducting trace and the eighth conducting trace are bilaterally symmetric to each other, the second conducting trace and the seventh conducting trace are bilaterally symmetric to each other, the third conducting trace and the sixth conducting trace are bilaterally symmetric to each other, and the fourth conducting trace and the fifth conducting trace are bilaterally symmetric to each other.

7. The signal modulator of claim 5, wherein the first conducting trace and the eighth conducting trace are equal in length, the second conducting trace and the seventh conducting trace are equal in length, the third conducting trace and the sixth conducting trace are equal in length, and the fourth conducting trace and the fifth conducting trace are equal in length.

8. The signal modulator of claim 1, wherein a first order of coupling the first in-phase oscillating signal and the first quadrature-phase oscillating signal to the first signal trace block is the same as a second order of coupling the second in-phase oscillating signal and the second quadrature-phase oscillating signal to the second signal trace block.

9. The signal modulator of claim 1, wherein an effective phase difference between the first oscillating signal and the second oscillating signal is larger than a specific phase difference by a phase value, and the effective phase difference between the third oscillating signal and the fourth oscillating signal is smaller than the specific phase difference by the phase value.

10. The signal modulator of claim 1, wherein the signal modulator is a part of a receiver arranged to receive the input signal being a wireless communication signal or a part of a transmitter arranged to transmit the input signal being a baseband signal according to the first oscillating signal, the second oscillating signal, the third oscillating signal, and the fourth oscillating signal.

11. A signal modulating method, comprising:

utilizing a modulating circuit to modulate an input signal according to a first oscillating signal, a second oscillating signal, a third oscillating signal, and a fourth oscillating signal;

utilizing a first signal trace block to conduct a first in-phase oscillating signal having a first phase to the modulating circuit such that the modulating circuit receives the first oscillating signal having a second phase, and to conduct a first quadrature-phase oscillating signal having a third phase to the modulating circuit such that the modulating circuit receives the second oscillating signal having a fourth phase; and utilizing a second signal trace block to conduct a second in-phase oscillating signal having a fifth phase to the modulating circuit such that the modulating circuit receives the third oscillating signal having a sixth phase, and to conduct a second quadrature-phase oscillating signal having a seventh phase to the modulating circuit such that the modulating circuit receives the fourth oscillating signal having an eighth phase;

wherein a phase difference between the second phase and the first phase and a phase difference between the eighth phase and the seventh phase substantially equal a first phase difference, and a phase difference between the fourth phase and the third phase and a phase difference between the sixth phase and the fifth phase substantially equal a second phase difference, the first phase difference is not equal to the second phase difference;

wherein the first in-phase oscillating signal, the first quadrature-phase oscillating signal, the second in-phase oscillating signal, and the second quadrature-phase oscillating signal are differential oscillating signals, each of the differential oscillating signals comprises a positive oscillating signal and a negative oscillating signal.

12. The signal modulating method of claim 11, wherein a phase of the first in-phase oscillating signal is the same as a phase of the second in-phase oscillating signal, and a phase of the first quadrature-phase oscillating signal is the same as a phase of the second quadrature-phase oscillating signal.

13. The signal modulating method of claim 11, wherein the step of utilizing the first signal trace block to conduct the first in-phase oscillating signal having the first phase to the modulating circuit such that the modulating circuit receives the first oscillating signal having the second phase, and to conduct the first quadrature-phase oscillating signal having the third phase to the modulating circuit such that the modulating circuit receives the second oscillating signal having the fourth phase comprises:

utilizing a first conducting circuit to conduct the first in-phase oscillating signal to the modulating circuit; and utilizing a second conducting circuit to conduct the first quadrature-phase oscillating signal to the modulating circuit; and the step of utilizing the second signal trace block to conduct the second in-phase oscillating signal having the fifth phase to the modulating circuit such that the modulating circuit receives the third oscillating signal having the sixth phase, and to conduct the second quadrature-phase oscillating signal having the seventh phase to the modulating circuit such that the modulating circuit receives the fourth oscillating signal having the eighth phase comprises:

utilizing a third conducting circuit to conduct the second in-phase oscillating signal to the modulating circuit; and utilizing a fourth conducting circuit to conduct the second quadrature-phase oscillating signal to the modulating circuit;

wherein one of the first conducting circuit and the second conducting circuit and one of the third conducting circuit and the fourth conducting circuit are symmetric to each other.

14. The signal modulating method of claim 13, wherein the first conducting circuit and the fourth conducting circuit are bilaterally symmetric to each other, and the second conducting circuit and the third conducting circuit are bilaterally symmetric to each other.

15. The signal modulating method of claim 11, wherein the step of utilizing the first signal trace block to conduct the first in-phase oscillating signal having the first phase to the modulating circuit such that the modulating circuit receives the first oscillating signal having the second phase, and to conduct the first quadrature-phase oscillating signal having the third phase to the modulating circuit such that the modulating circuit receives the second oscillating signal having the fourth phase comprises:

utilizing a first conducting circuit comprising a first conducting trace and a second conducting trace to conduct the positive oscillating signal and the negative oscillating signal of the first in-phase oscillating signal to the modulating circuit, respectively;

utilizing a second conducting circuit comprising a third conducting trace and a fourth conducting trace to conduct the negative oscillating signal and the positive oscillating signal of the first quadrature-phase oscillating signal to the modulating circuit, respectively;

the step of utilizing the second signal trace block to conduct the second in-phase oscillating signal having the fifth phase to the modulating circuit such that the modulating circuit receives the third oscillating signal having the sixth phase, and to conduct the second quadrature-phase oscillating signal having the seventh phase to the modulating circuit such that the modulating circuit receives the fourth oscillating signal having the eighth phase comprises:

utilizing a third conducting circuit comprising a fifth conducting trace and a sixth conducting trace to conduct the positive oscillating signal and the negative oscillating signal of the second in-phase oscillating signal to the modulating circuit, respectively;

utilizing a fourth conducting circuit comprising a seventh conducting trace and an eighth conducting trace to conduct the negative oscillating signal and the positive oscillating signal of the second quadrature-phase oscillating signal to the modulating circuit, respectively;

wherein one of the conducting traces of the first signal trace block and one of the conducting traces of the second signal trace block are symmetric to each other.

16. The signal modulating method of claim 15, wherein the first conducting trace and the eighth conducting trace are bilaterally symmetric to each other, the second conducting trace and the seventh conducting trace are bilaterally symmetric to each other, the third conducting trace and the sixth conducting trace are bilaterally symmetric to each other, and the fourth conducting trace and the fifth conducting trace are bilaterally symmetric to each other.

17. The signal modulating method of claim 15, wherein the first conducting trace and the eighth conducting trace are equal in length, the second conducting trace and the seventh conducting trace are equal in length, the third conducting trace and the sixth conducting trace are equal in length, and the fourth conducting trace and the fifth conducting trace are equal in length.

18. The signal modulating method of claim 11, wherein a first order of coupling the first in-phase oscillating signal and the first quadrature-phase oscillating signal to the first signal trace block is the same as a second order of coupling the second in-phase oscillating signal and the second quadrature-phase oscillating signal to the second signal trace block.

19. The signal modulator of claim 11, wherein an effective phase difference between the first oscillating signal and the second oscillating signal is larger than a specific phase difference by a phase value, and the effective phase difference between the third oscillating signal and the fourth oscillating signal is smaller than the specific phase difference by the phase value.

\* \* \* \* \*